(12) United States Patent
Parendo et al.

(10) Patent No.: US 11,691,203 B2
(45) Date of Patent: Jul. 4, 2023

(54) STEP DRILL BIT

(71) Applicant: MILWAUKEE ELECTRIC TOOL CORPORATION, Brookfield, WI (US)

(72) Inventors: Brett A. Parendo, Milwaukee, WI (US); Richard Hohnl, Jr., Racine, WI (US); David Hlavac, Germantown, WI (US); Alexander R. Greenhill, St. Louis, MO (US); Ingolfur Ludviksson, Wauwatosa, WI (US); Max R. Sawa, Palatine, IL (US); James E. Pangerc, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/355,500

(22) Filed: Jun. 23, 2021

(65) Prior Publication Data

US 2021/0316375 A1     Oct. 14, 2021

Related U.S. Application Data

(63) Continuation of application No. 16/387,621, filed on Apr. 18, 2019, now Pat. No. 11,273,501.
(Continued)

(51) Int. Cl.
  *B23B 51/02*     (2006.01)
  *B23B 51/00*     (2006.01)

(52) U.S. Cl.
  CPC ...... *B23B 51/009* (2013.01); *B23B 2251/043* (2013.01)

(58) Field of Classification Search
  CPC ............ B23B 51/009; B23B 2251/046; B23B 2251/043; B23B 2251/04
  See application file for complete search history.

(56) References Cited

U.S. PATENT DOCUMENTS

| | | |
|---|---|---|
| 213,937 A | 4/1879 | Reichardt |
| 347,864 A | 8/1886 | Berg |

(Continued)

FOREIGN PATENT DOCUMENTS

| | | |
|---|---|---|
| CN | 2623387 Y | 7/2004 |
| CN | 2820394 Y | 9/2006 |

(Continued)

OTHER PUBLICATIONS

RUKO Step Drill Catalog, pp. 59-68, publicly available at least as early as Jun. 2, 2011.

(Continued)

*Primary Examiner* — Alan Snyder
(74) *Attorney, Agent, or Firm* — Michael Best & Friedrich LLP

(57) ABSTRACT

A step drill bit includes a shank and a body having a proximal end adjacent the shank and a distal end opposite the proximal end. The body defines a plurality of axially stacked, progressively sized steps including a first step at the distal end, a terminal step at the proximal end, and a plurality of intermediate steps having incrementally increasing diameters disposed between the first and terminal steps. The step drill bit also includes a plurality of cutting edges each disposed along one of the plurality of steps. Each edge defines a helix angle and a radial rake angle. The radial rake angle and the helix angle of the cutting edge at the terminal step is greater than the radial rake angle and the helix angle of the cutting edge at the first step.

20 Claims, 9 Drawing Sheets

Related U.S. Application Data

(60) Provisional application No. 62/662,857, filed on Apr. 26, 2018.

(56) References Cited

U.S. PATENT DOCUMENTS

| | | |
|---|---|---|
| 499,098 A | 6/1893 | Comstock |
| 550,190 A | 11/1895 | Myers |
| 716,557 A | 12/1902 | Klingensmith |
| 938,484 A | 11/1909 | Hanson |
| 1,620,536 A | 3/1927 | Gairing |
| 2,193,186 A | 3/1940 | Bannister |
| 2,276,532 A | 3/1942 | Welty |
| 2,389,909 A | 11/1945 | Hofbauer |
| 2,555,746 A | 6/1951 | Horsky et al. |
| 2,607,562 A | 8/1952 | Phipps |
| D178,899 S | 10/1956 | Olsen |
| 2,786,373 A | 3/1957 | Patton |
| 2,855,181 A | 10/1958 | Olsen |
| 2,897,696 A | 8/1959 | Tisserant |
| 2,984,130 A | 5/1961 | Lentz |
| 3,076,356 A | 2/1963 | Simich |
| 3,564,945 A | 2/1971 | Bradley |
| 3,645,640 A | 2/1972 | Zukas |
| 3,696,875 A | 10/1972 | Cortes |
| 3,758,222 A | 9/1973 | Oakes |
| 3,768,581 A | 10/1973 | Rederon |
| 3,836,278 A | 9/1974 | McInnes |
| 4,032,251 A | 6/1977 | Ribich |
| 4,073,354 A | 2/1978 | Rowley et al. |
| 4,098,363 A | 7/1978 | Rohde et al. |
| 4,116,578 A | 9/1978 | Gelfand et al. |
| 4,127,355 A | 11/1978 | Oakes |
| 4,189,266 A | 2/1980 | Koslow |
| 4,207,954 A | 6/1980 | Jerome |
| 4,244,432 A | 1/1981 | Rowley et al. |
| 4,351,401 A | 9/1982 | Fielder |
| 4,360,069 A | 11/1982 | Davis |
| 4,561,812 A | 12/1985 | Lindén |
| 4,582,458 A | 4/1986 | Korb et al. |
| 4,662,803 A | 5/1987 | Arnold |
| 4,815,902 A | 3/1989 | Durfee, Jr. |
| 4,932,815 A | 6/1990 | Krauss |
| 5,174,692 A | 12/1992 | Martin |
| 5,273,380 A | 12/1993 | Musacchia |
| 5,288,183 A | 2/1994 | Chaconas et al. |
| 5,326,196 A | 7/1994 | Noll |
| 5,427,477 A | 6/1995 | Weiss |
| 5,452,971 A | 9/1995 | Nevills |
| 5,466,100 A | 11/1995 | Ahluwalia |
| 5,622,462 A | 4/1997 | Gakhar et al. |
| 5,807,039 A | 9/1998 | Booher et al. |
| 5,915,893 A | 6/1999 | Miyanaga |
| 6,021,857 A | 2/2000 | Birk |
| 6,190,097 B1 | 2/2001 | Thomas |
| 6,290,438 B1 | 9/2001 | Papajewski |
| D449,627 S | 10/2001 | Tateno et al. |
| 6,428,250 B2 | 8/2002 | Giebmanns |
| 6,796,759 B2 | 9/2004 | Aasgaard |
| 6,890,133 B2 | 5/2005 | Singh et al. |
| D526,670 S | 8/2006 | Ibey |
| 7,171,871 B2 | 2/2007 | Kozak |
| 7,357,606 B1 | 4/2008 | Pettit et al. |
| 7,455,485 B2 | 11/2008 | Boyd et al. |
| 7,458,646 B2 | 12/2008 | Marathe et al. |
| 7,871,224 B2 | 1/2011 | Dost et al. |
| 8,029,215 B2 | 10/2011 | Gentry et al. |
| 8,070,397 B2 | 12/2011 | Durfee |
| 8,070,398 B2 | 12/2011 | Durfee |
| 8,215,206 B2 | 7/2012 | Kozak et al. |
| 8,388,280 B1 | 3/2013 | Ison et al. |
| 8,764,355 B2 | 7/2014 | Durfee |
| 8,784,017 B2 | 7/2014 | Ibarra et al. |
| 9,676,041 B2 | 6/2017 | Allen |
| 9,731,358 B2 | 8/2017 | Allen et al. |
| 10,245,656 B2 | 4/2019 | Piper et al. |
| 10,328,500 B2 | 6/2019 | Morton et al. |
| 10,421,130 B2 | 9/2019 | Van Essen et al. |
| D872,783 S | 1/2020 | Parendo et al. |
| D881,241 S | 4/2020 | Parendo et al. |
| D892,183 S | 8/2020 | Parendo et al. |
| 2001/0010784 A1 | 8/2001 | Giebmanns |
| 2003/0202853 A1 | 10/2003 | Ko et al. |
| 2004/0062619 A1 | 4/2004 | Ruppert |
| 2004/0076483 A1 | 4/2004 | Singh et al. |
| 2004/0129125 A1 | 7/2004 | Colquhoun |
| 2004/0265082 A1 | 12/2004 | Abrams |
| 2006/0085005 A1 | 4/2006 | Kenealy, III et al. |
| 2006/0093448 A1 | 5/2006 | Kelsey |
| 2006/0150780 A1 | 7/2006 | Chen |
| 2007/0020057 A1 | 1/2007 | Chen |
| 2007/0264094 A1 | 11/2007 | Seeley |
| 2008/0029311 A1 | 2/2008 | Seeley |
| 2008/0085488 A1 | 4/2008 | Lazarof |
| 2008/0166195 A1 | 7/2008 | Gentry et al. |
| 2008/0166196 A1 | 7/2008 | Zhu |
| 2010/0054881 A1 | 3/2010 | Thomas et al. |
| 2010/0092259 A1 | 4/2010 | Borschert et al. |
| 2010/0254779 A1 | 10/2010 | Wedner |
| 2010/0260567 A1 | 10/2010 | Kauper |
| 2011/0038679 A1 | 2/2011 | Kozak |
| 2011/0091297 A1 | 4/2011 | Itoh et al. |
| 2011/0116884 A1 | 5/2011 | Li |
| 2011/0268517 A1 | 11/2011 | Bomireddy et al. |
| 2012/0082523 A1 | 4/2012 | Bozkurt |
| 2012/0195704 A1 | 8/2012 | White |
| 2014/0023448 A1 | 1/2014 | Yanagida et al. |
| 2014/0369776 A1 | 12/2014 | Durfee |
| 2017/0129022 A1 | 5/2017 | Durfee |

FOREIGN PATENT DOCUMENTS

| | | |
|---|---|---|
| CN | 2822839 Y | 10/2006 |
| CN | 1891383 A | 1/2007 |
| CN | 201012402 Y | 1/2008 |
| CN | 201012404 Y | 1/2008 |
| CN | 201020559 Y | 2/2008 |
| CN | 101288912 A | 10/2008 |
| CN | 201151004 Y | 11/2008 |
| CN | 201565643 U | 9/2010 |
| CN | 201579463 U | 9/2010 |
| DE | 1041324 B | 10/1958 |
| DE | DD246060 | 5/1987 |
| DE | 19526686 A1 | 3/1996 |
| DE | 29703475 U1 | 6/1997 |
| DE | 29904042 U1 | 7/1999 |
| DE | 19903276 A1 | 8/2000 |
| DE | 20015550 U1 | 10/2000 |
| DE | 19950390 A1 | 4/2001 |
| DE | 20303656 U1 | 6/2003 |
| DE | 20318529 U1 | 5/2005 |
| DE | 202008000368 U1 | 4/2008 |
| DE | 202010006336 U1 | 9/2010 |
| DE | 202014010622 U1 | 2/2016 |
| EP | 0482982 A1 | 4/1992 |
| EP | 0811449 A2 | 12/1997 |
| EP | 1340573 B1 | 7/2006 |
| EP | 1924381 B1 | 7/2009 |
| EP | 2799171 A1 | 11/2014 |
| GB | 155004 A | 12/1920 |
| GB | 540073 A | 10/1941 |
| GB | 2050214 A | 1/1981 |
| GB | 2405820 A | 3/2005 |
| GB | 2419555 A | 5/2006 |
| JP | 63016912 A | 1/1988 |
| JP | 7156007 A | 6/1995 |
| JP | 9103905 A | 4/1997 |
| JP | 9212008 A | 8/1997 |
| JP | 9285907 A | 11/1997 |
| JP | 9323209 A | 12/1997 |
| JP | 11239907 A | 9/1999 |
| JP | 2001105216 A | 4/2001 |
| JP | 2006082420 A | 3/2006 |
| JP | 2007007831 A | 1/2007 |
| JP | 2007203396 A | 8/2007 |

(56) References Cited

FOREIGN PATENT DOCUMENTS

| | | | |
|---|---|---|---|
| JP | 2014054680 A | 3/2014 |
| JP | 2016041455 A | 3/2016 |
| WO | WO1983001215 A1 | 4/1983 |
| WO | WO2001010587 A1 | 2/2001 |
| WO | WO2004082874 A1 | 9/2004 |
| WO | WO2008092386 A1 | 8/2008 |
| WO | WO2014197761 A1 | 12/2014 |
| WO | 2020002581 A1 | 1/2020 |

OTHER PUBLICATIONS

Bosch Step Drill Bit with Spiral Flute, publicly available at least as early as Jun. 2, 2011.
RUKO Tools—Step Drill Bits, vol. 13, e 33-3, publicly available at least as early as Jun. 2, 2011.
International Search Report and Written Opinion for Application No. PCT/US2014/041221 dated Sep. 26, 2014 (21 pages).
German Patent Office Action for Application No. 112014002733.2 dated Mar. 21, 2019, with English translation, 16 pages.
European Patent Office Extended Search Report for Application No. 19171221.5 dated Aug. 23, 2019 (14 pages).
United Kingdom Intellectual Property Office Action for Application No. GB1518486.4 dated Nov. 7, 2019 (5 pages).
United Kingdom Intellectual Property Office Action for Application No. GB200230635 dated Mar. 26, 2020 (5 pages).
Extended European Search Report for Application No. 22170818.3 dated Jan. 30, 2023 (8 pages).

STEP DRILL BIT

CROSS REFERENCE TO RELATED APPLICATIONS

This application is a continuation of U.S. application Ser. No. 16/387,621, filed Apr. 18, 2019, now U.S. Pat. No. 11,273,501, which claims priority to U.S. Provisional Patent Application No. 62/662,857, filed Apr. 26, 2018, the entire contents of which are incorporated by reference herein.

BACKGROUND

The present invention relates to power tool accessories. More specifically, the present invention relates to step drill bits.

Step drill bits are used in a variety of applications and industries where a user may need to drill holes through a thin-walled work piece. A step drill bit allows a user to drill holes in a progressive range of sizes with a single bit. Step drill bits can be coupled to a power tool such as a drill or an impact driver. In cases where a step drill bit is used with an impact driver, a cutting edge of the step drill edge is more prone to chipping.

SUMMARY

In one embodiment, the invention provides a drill bit including a shank extending along a bit axis and a body with a proximal end adjacent the shank and a distal end opposite the proximal end. The body defines a plurality of axially stacked, progressively sized steps including a first step at the distal end and a terminal step at the proximal end. The drill bit also includes a flute in the body. The flute defines an elongated groove that extends from the distal end to the proximal end. The drill bit further includes a plurality of cutting edges formed in the body. Each cutting edge is disposed along one of the plurality of steps and defines a helix angle and a rake angle. The helix angle of the cutting edge at the terminal step is greater than the helix angle of the cutting edge at the first step. A ratio of the helix angle to the rake angle of the cutting edge at the first step is in a range from 0.5 to 2.4, and a ratio of the helix angle to the rake angle of the cutting edge at the terminal step is in a range of 0.9 to 1.7.

In another embodiment, the invention provides a drill bit including a shank extending along a bit axis and a body with a proximal end adjacent the shank and a distal end opposite the proximal end. The body defines a plurality of axially stacked, progressively sized steps including a first step at the distal end and a terminal step at the proximal end. The drill bit also includes a flute in the body. The flute defines an elongated groove that extends from the distal end to the proximal end. The drill bit further includes a plurality of cutting edges formed in the body. Each cutting edge is disposed along one of the plurality of steps and defines a helix angle and a rake angle. The helix angle of the cutting edge at the terminal step is greater than the helix angle of the cutting edge at the first step. The rake angle of the cutting edge at the terminal step is greater than the rake angle of the cutting edge at the first step.

In another embodiment, the invention provides a drill bit including a shank extending along a bit axis and a body with a proximal end adjacent the shank and a distal end opposite the proximal end. The body defines a plurality of axially stacked, progressively sized steps including a first step at the distal end and a terminal step at the proximal end. The drill bit also includes at least one flute in the body. Each flute defines an elongated groove that extends from the distal end to the proximal end. The drill bit further includes a plurality of cutting edges formed in the body. Each cutting edge is disposed along one of the plurality of steps and defines a helix angle and a rake angle. The helix angle of the cutting edge at the terminal step increases by at least 70 percent relative to the helix angle of the cutting edge at the first step. The rake angle of the cutting edge at the terminal step increases by at least 40 percent relative to the rake angle of the cutting edge at the first step.

Other aspects of the present subject matter will become apparent by consideration of the detailed description and accompanying drawings.

Before any embodiments are explained in detail, it is to be understood that the present subject matter is not limited in its application to the details of construction and the arrangement of components set forth in the following description or illustrated in the following drawings. The present subject matter is capable of other embodiments and of being practiced or of being carried out in various ways. As used herein, the term "approximately" refers to values within a rounding range and manufacturing tolerances of the listed value.

DETAILED DESCRIPTION

FIGS. 1-7 illustrate a step drill bit 10 for use with a power tool, such as, for example, a drill, a driver drill, an impact driver, and the like. The step drill bit 10 may be used to cut holes or drill into a workpiece such as sheet metal, wood, and the like. The illustrated step drill bit 10 comes in a variety of sizes that correspond to the type of hole to be drilled.

Figure 1:
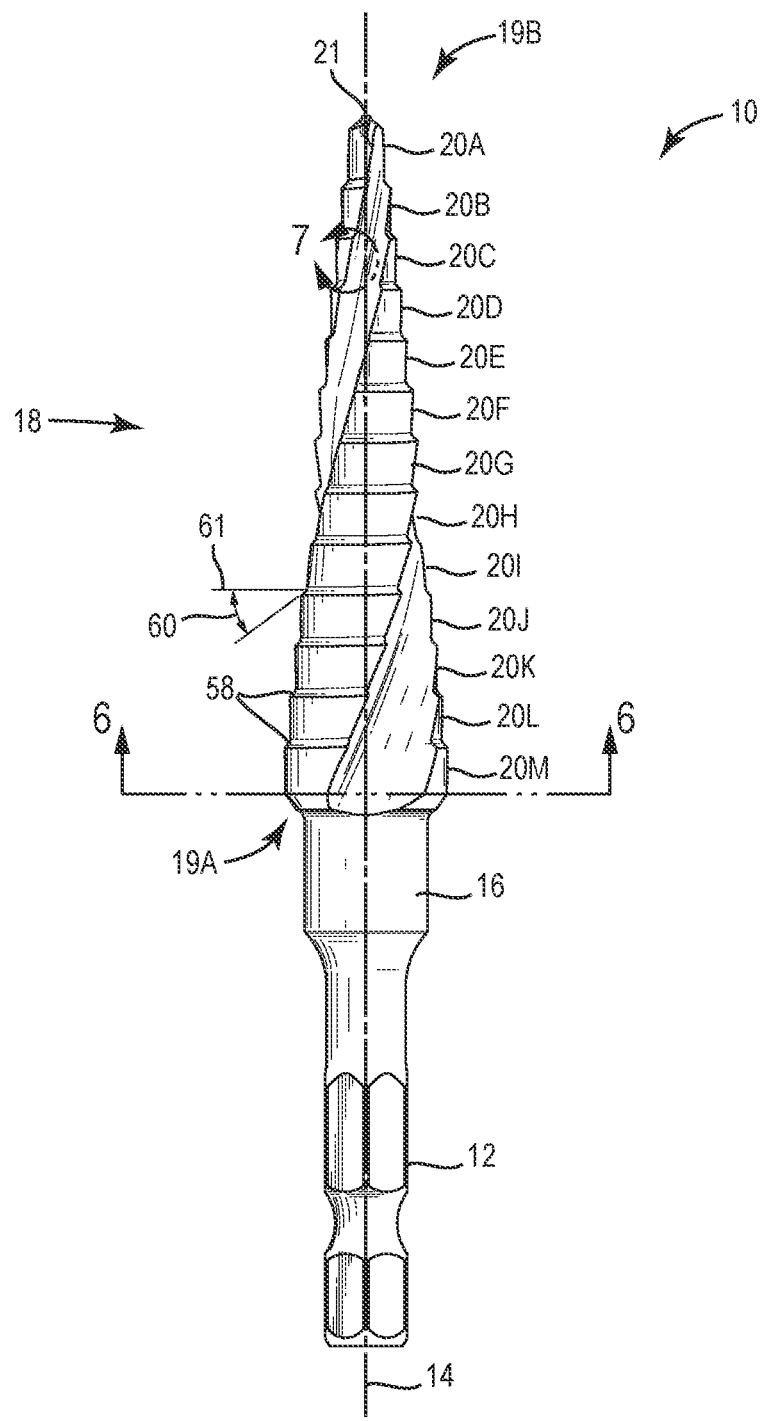
FIG. 1 is a side view of a step drill bit according to one embodiment of the invention.
Figure 2:
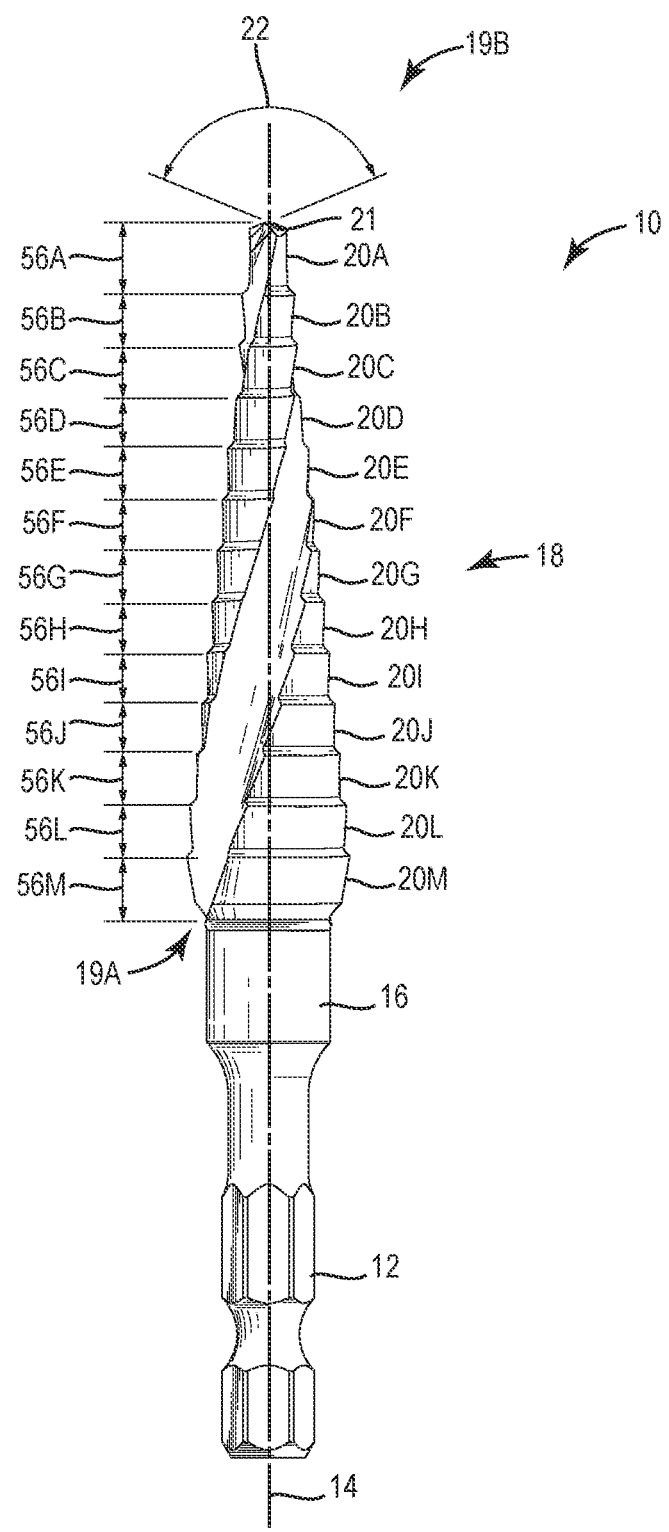
FIG. 2 is another side view of the step drill bit of FIG. 1 rotated 90 degrees.

FIGS. 1 and 2 illustrate a step drill bit 10 including a shank 12, a transition portion 16, and a body 18. The shank 12 is configured to engage a power tool for rotation of the step drill bit 10 about a bit axis 14. The illustrated bit axis 14 is a central longitudinal axis of the step drill bit 10. The transition portion 16 is defined between the shank 12 and the body 18. The body 18 includes a first or proximate end 19A adjacent the shank 12 and a second or distal end 19B opposite the proximate end 19A. The body 18 defines axially stacked, progressively sized steps 20A-20M between a bit tip 21 and the transition portion 16. The steps 20A-20M are axially stacked in that the steps 20A-20M are coaxially arranged along the bit axis 14. In addition, the steps 20A-20M are progressively sized in that the steps 20A-20M incrementally increase in size (e.g., diameter) from the bit tip 21, or the distal end 19B, of the body 18 to the transition portion 16, or proximate end 19A. In the illustrated embodiment, the body 18 includes thirteen steps 20A-20M. In other embodiments, the body 18 may include fewer or more steps.

With continued reference to FIG. 1, the shank 12 may be a hex-shaped shaft, a round shaped shank, a 3-flat type shank, or any other shank 12 that is configured to be coupled to a power tool. In the illustrated embodiment, the shank 12 has a diameter between of approximately 0.125 inches to 0.3 inches. In some embodiments, an indication band may be located on the shank 12. The indication band may indicate to a user the type of the step drill bit 10. In further embodiments, the step drill bit 10 may include laser engravings that indicate to a user the size or type of step drill bit. The indication band may be a variety of colors such as red, green, blue, purple, orange, yellow, etc.

As shown in FIG. 2, each of the steps 20A-20M of the body 18 has a step height 56A-56M. The step heights 56A-56M are not required to be the same for all steps. For example, in some embodiments, steps that correspond to commonly-used drill diameters (e.g., 0.5 inch, 0.75 inch, etc.) may have larger heights to allow a user to more easily control the step drill bit 10 to stop at those corresponding steps. The illustrated steps include a first step 20A at the distal end 19B of the body 18 and a terminal step 20M coupled to the transition portion 16. In the illustrated embodiment, the first step 20A has a diameter of approximately 0.125 inches, and the terminal step 20M has a diameter of approximately 0.505 inches. The diameter of the terminal step 20M defines a max diameter of the step drill bit 10. The diameter of the terminal step 20M is greater than a diameter of the transition portion 16. The intermediate steps 20B-20L located between the first and terminal steps 20A, 20M have incrementally increasing diameters within the range of 0.125 inches and 0.505 inches. In other embodiments, as further described below, the body 18 may include fewer or more steps, and/or each step 20A-20M may have a different diameter.

With reference back to FIG. 1, a step chamfer 58 is formed between each pair of adjacent steps 20A-20M. The step chamfer 58 connects two adjacent steps at a ramp angle 60 to provide a smoother transition between the adjacent steps. The ramp angle 60 is measured between a surface of the corresponding step chamfer 58 and a plane 61 extending perpendicular to the bit axis 14. In the illustrated embodiment, the ramp angle 60 for all of the step chamfers 58 is between approximately 40 degrees and approximately 50 degrees, and more specifically, approximately 45 degrees. In other embodiments, the ramp angle 60 may be relatively larger or smaller, or the step chamfers 58 may be omitted. In the illustrated embodiment, the ramp angle 60 is the same for all the steps 20. In other embodiments, the ramp angle 60 may vary per step 20

Figure 5:
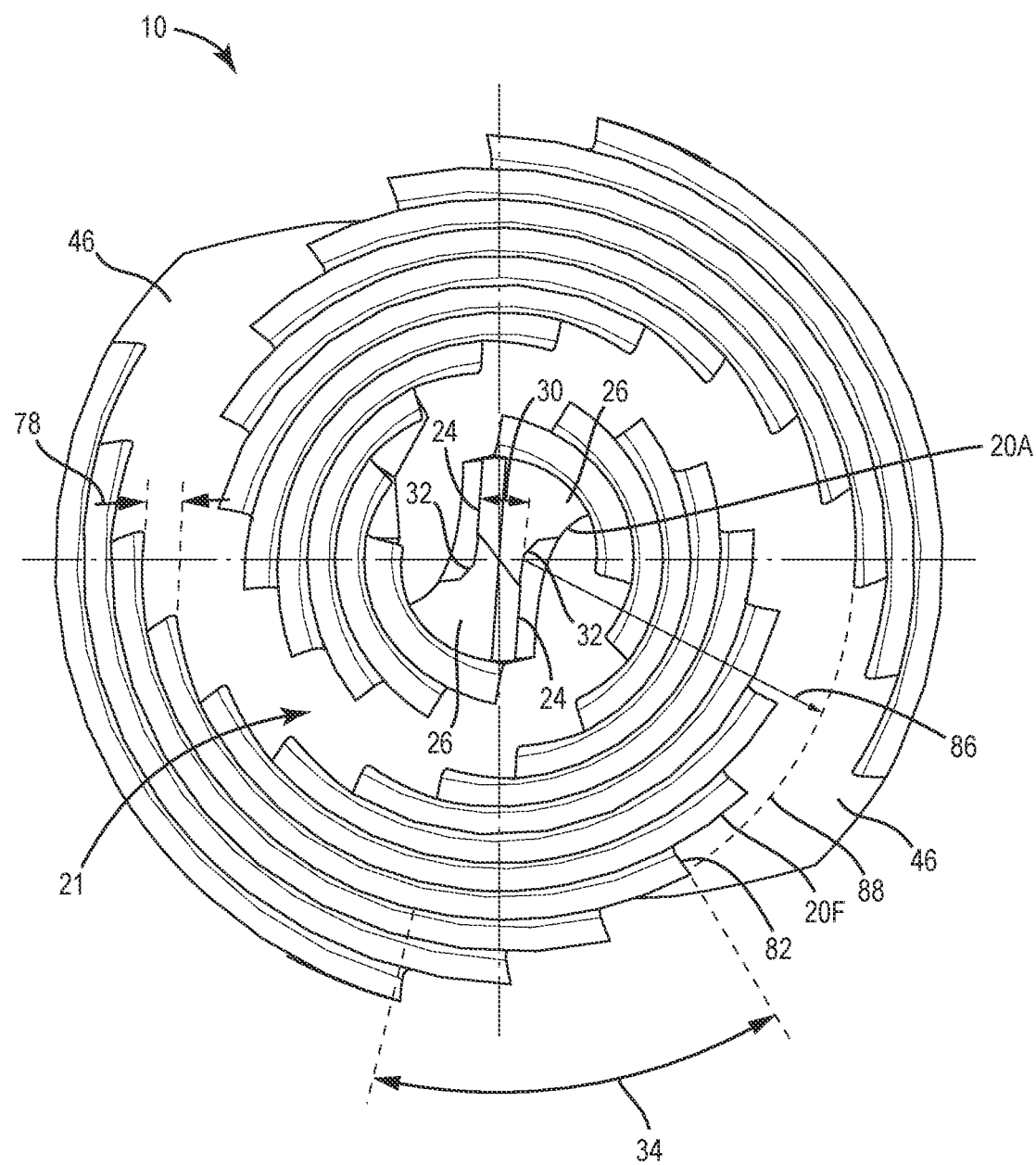
FIG. 5 is a top view of the step drill bit of FIG. 1.

With reference back to FIG. 2, the bit tip 21 has a primary tip angle 22 measured through the bit axis 14. In some embodiments, the tip angle 22 is between approximately 130 degrees and approximately 140 degrees. In the illustrated embodiment, the tip angle 22 is approximately 135 degrees. As shown in FIG. 5, the bit tip 21 includes a dual-relief tip having two first chisel surfaces 24 and two second chisel surfaces 26. Each first chisel surface 24 is located on an opposite side of a chisel edge 28 of the bit tip 21 from a corresponding second chisel surface 26. The bit tip 21 defines a chisel width 30 measured between cutting edges 32 of the chisel surfaces 24, 26. In some embodiments, the chisel width 30 is between approximately 0.02 inches and 0.03 inches. In other embodiments, the chisel width 30 is between approximately 0.022 inches and approximately 0.028 inches. In the illustrated embodiment, the chisel width 30 is approximately 0.025 inches. In further embodiments, the primary tip angle 22 and/or the chisel width 30 may be relatively larger or smaller.

Figure 3:
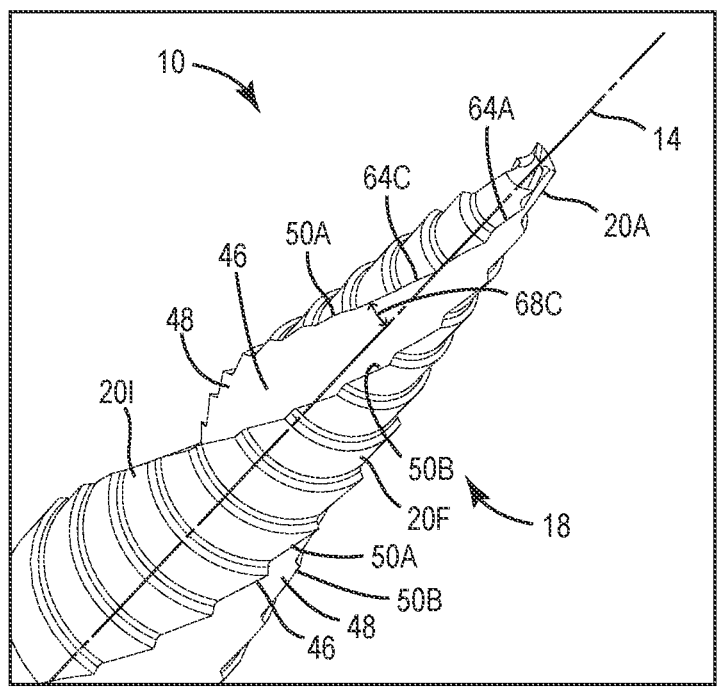
FIG. 3 is a first perspective view of the step drill bit of FIG. 1.
Figure 4:
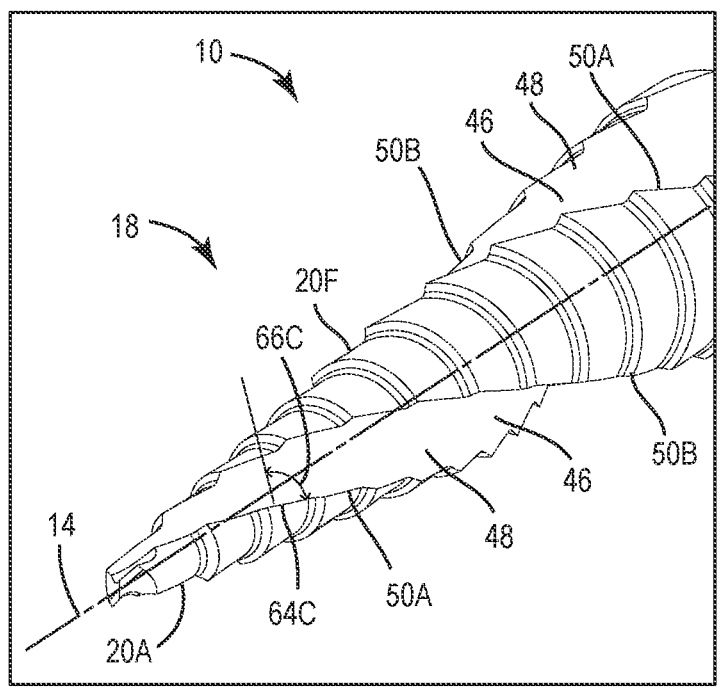
FIG. 4 is a second perspective view of the step drill bit of FIG. 1.

Referring to FIGS. 3-4, the body 18 defines two body flutes 46 disposed on diametrically opposite sides of the bit axis 14. Each of the flutes 46 is helically wrapped around the body 18 and extends from the first step 20A to the transition portion 16. Each flute 46 defines a groove 48 between two edges 50A-B in the body 18. In the illustrated embodiment, the step drill bit 10 includes two flutes 46. In other embodiments, the step drill bit 10 may include a single flute 46 or more than two flutes 46.

Figure 6:
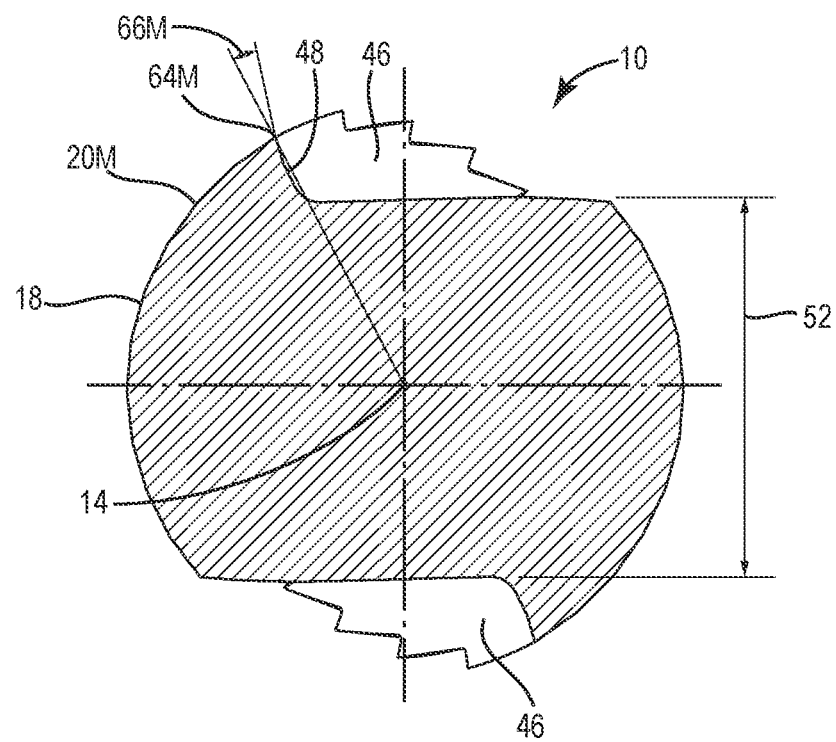
FIG. 6 is a cross section view of the step drill bit of FIG. 1 taken along section line 6-6.

With continued reference to FIGS. 3-4, each of the steps 20A-20M includes a leading cutting edge (e.g., cutting edges 64A labeled in FIG. 3, cutting edge 64C labeled in FIGS. 3 and 4, and cutting edge 64M labeled in FIG. 6). The leading cutting edges are defined on the edge 50A of the groove 48 of the flute 46. Each cutting edge forms a rake angle (i.e., a radial rake angle) between the outer periphery of a respective step 20A-20M and the surface of the groove 48 (e.g., rake angle 66C labeled in FIG. 4 and rake angle 66M labeled in FIG. 6). In the illustrated embodiment, the rake angle at the first step 20A is approximately 5 degrees and the rake angle at the terminal step 20M is approximately 25 degrees. The intermediate steps 20B-20L have incrementally increasing rake angles that are within a range from 5 degrees and 25 degrees. In some embodiments, the increase to the rake angles may be linear or non-linear. In other embodiments, the rake angles may be smaller than 5 degrees or bigger than 25 degrees. Additionally, each cutting edge defines a helix angle that is measured between the cutting edge 64A-64M and the bit axis 14 (e.g., helix 68C labeled in FIG. 3). In the illustrated embodiment, the helix angle at the first step 20A is approximately 12 degrees and the helix angle at the terminal step 20M is approximately 22 degrees. The intermediate steps 20B-20L have incrementally increasing helix angles that are within a range from 12 degrees to 22 degrees. In some embodiments, the increase to the helix angles may be linear or non-linear. In other embodiments, the helix angles may be smaller than 12 degrees or larger than 22 degrees. In the illustrated embodiment, a ratio between the helix angle and the rake angle for the first step 20A is approximately 2.4, and the ratio between the helix angle and the rake angle for the terminal step 20M is approximately 0.9.

With reference to FIG. 6, a core depth 52 of the step drill bit 10 is defined between the two flutes 46 of the body 18 extending through the bit axis 14. The core depth 52 increases from the distal end 19B of the body 18 to the proximal end 19B of the body. As such, the core depth 52 increases every step 20A-20M from the first step 20A to the terminal step 20M. The core depth 52 may be in a range from 0.05 inches to 0.6 inches.

Figure 7:
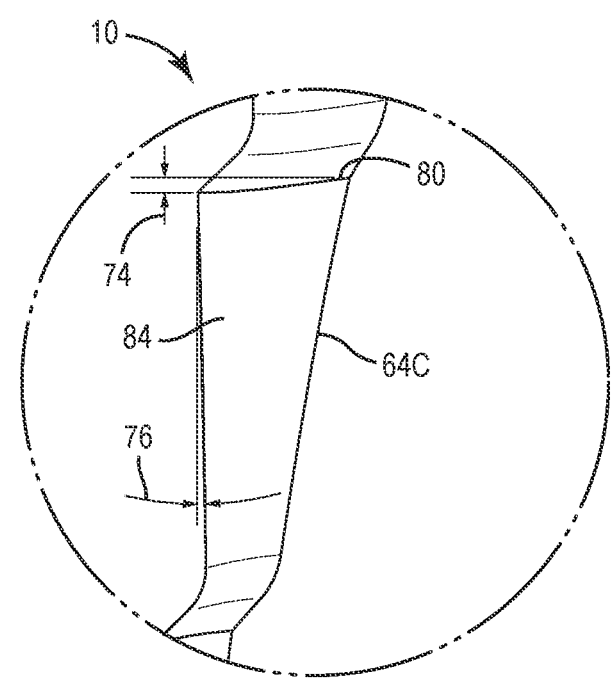
FIG. 7 is a detailed view of section 7 of the step drill bit of FIG. 1

The thirteen steps 20A-20M of the step drill bit 10 each include three types of reliefs: an axial relief 74 (FIG. 7), a diametral relief 76 (FIG. 7), and a radial relief 78 (FIG. 5). As shown in FIG. 7, the axial relief 74 of each step 20A-20M is the amount by which an upper edge 80 of the step (i.e., the edge of the step closest to the distal end of the body 18) translates along the bit axis 14 toward the distal end as the upper edge 80 nears a leading cutting edge 64C of the step (i.e., the edge of the step at the body flute 46). In some embodiments, the axial relief 74 of each step 20A-20M is between approximately 0.002 inches and approximately 0.01 inches. In the illustrated embodiment, the axial relief 74 is approximately 0.005 inches. In other embodiments, the axial relief 74 may be relatively larger or smaller.

With continued reference to FIG. 7, the diametral relief 76 of each step 20A-20M is the amount by which an outer circumferential surface 84 of the step tapers radially inward or outward along the bit axis 14. In the illustrated embodiment, the diametral relief 76 of each step 20A-20M is between approximately −1 degree and approximately 1 degree. In some embodiments, the diametral relief 76 may be omitted (i.e., may be 0 degrees). In other embodiments, the diametral relief 76 may be a relatively greater positive degree or a relatively greater negative degree.

With reference to FIG. 5, the radial relief 78 is the amount by which a radius 86 of the steps 20A-20M decreases as the outer surface of the step 20A-20M moves away from the leading edge 82. More particularly, a constant diameter circle 88 is illustrated in FIG. 5 in broken lines, representing the nominal diameter of the third step 201. The radial relief 78 continuously increases along a radial relief angle 34 from the leading edge 82 of the step to a point at which the radial relief 78 has reached its maximum value or amount. As used herein, the "radial relief" is the maximum amount that the radius 86 of the step 201 decreases radially inward from the nominal diameter 88. In some embodiments, the radial relief 78 of each step 20A-20M is between approximately 0.002 inches and approximately 0.01 inches. In the illustrated embodiment, the radial relief 78 is approximately 0.005 inches. In addition, the radial relief angle 34 of each step 20A-20M is between approximately 40 degrees and approximately 50 degrees from the leading edge 82. In the illustrated embodiment, the radial relief angle 34 is approximately 45 degrees. In other embodiments, the radial relief 78 and/or the radial relief angle 34 may be relatively larger or smaller.

Figure 8:
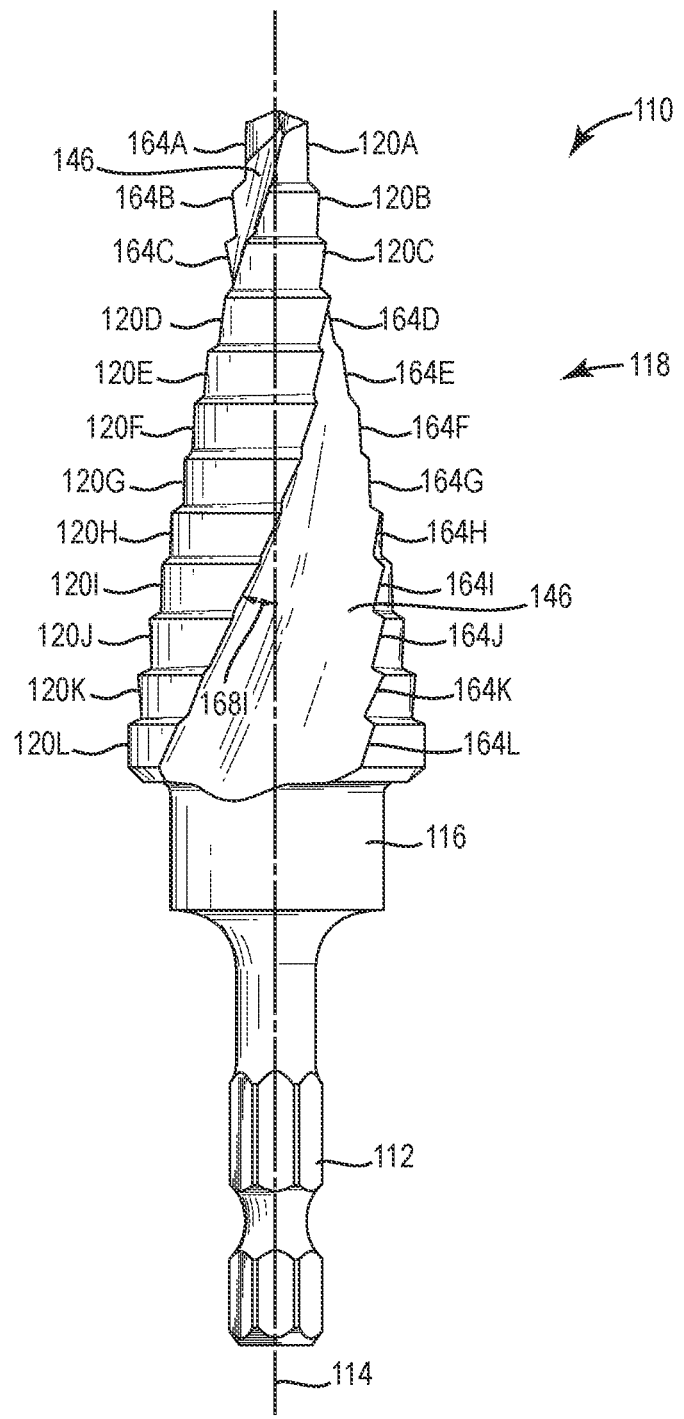
FIG. 8 is a side view of a step drill bit according to another embodiment of the invention.
Figure 9:
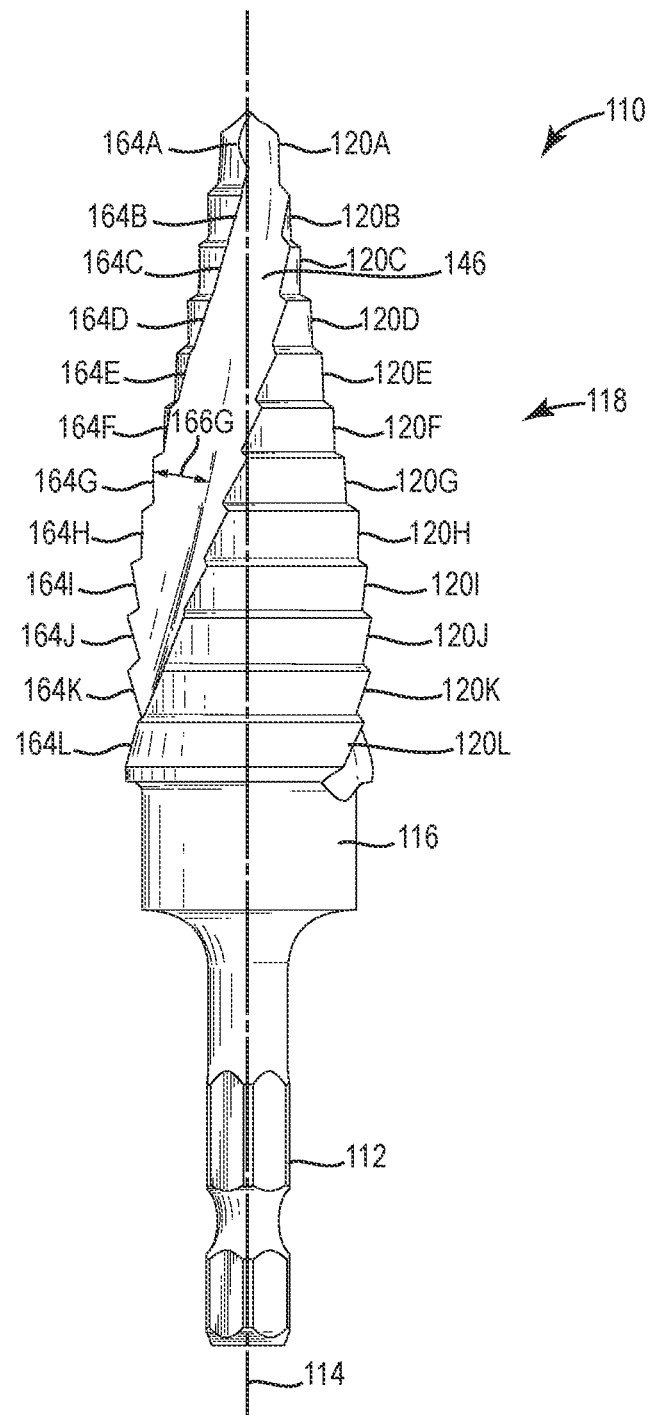
FIG. 9 is another side view of the step drill bit of FIG. 8 rotated 90 degrees.

FIGS. 8-9 illustrate a step drill bit 110 according to another embodiment of the invention. The step drill bit 110 includes features similar to the step drill bit 10 of FIGS. 1-7, and like features have been given like reference numbers plus 100. The step drill bit 110 may include any combination of features, dimensions, or range of dimensions from the preceding or subsequent embodiments, but only features of the step drill bit 110 not yet discussed with respect to the previous embodiment are detailed below.

The step drill bit 110 includes two flutes 146 and twelve axially stacked, progressively sized steps 120A-120L. A first step 120A has a diameter of approximately 0.188 inches, and a terminal step 120L has a diameter of approximately 0.88 inches. Each of the steps 120A-120L include a leading cutting edge 164A-164L. Each cutting edge 164A-164L forms a rake angle (e.g., rake angle 166G labeled in FIG. 9) between the outer periphery of a respective step 120A-120L and the surface of a flute 146 and a helix angle (e.g., helix angle 1681 labeled in FIG. 8) that is measured between the cutting edge 164A-164L and a bit axis 114.

The rake angle at the first step 120A is approximately 5 degrees, and the rake angle at the terminal step 20L is approximately 18 degrees. The intermediate steps 120B-120K have incrementally increasing rake angles that are within a range from 5 degrees and 18 degrees. In some embodiments, the increase to the rake angles may be linear or non-linear. In other embodiments, the rake angles may be smaller than 5 degrees or bigger than 18 degrees.

The helix angle at the first step 120A is approximately 7 degrees, and the helix angle at the terminal step 120L is approximately 29 degrees. The intermediate steps 120B-220K have incrementally increasing helix angles that are within a range from 7 degrees to 29 degrees. In some embodiments, the increase to the helix angles may be linear or non-linear. In other embodiments, the helix angles may be smaller than 7 degrees or larger than 29 degrees. In the illustrated embodiment, a ratio between the helix angle and the rake angle for the first step 120A is approximately 1.4, and the ratio between the helix angle and the rake angle for the terminal step 120L is approximately 1.6.

Figure 10:
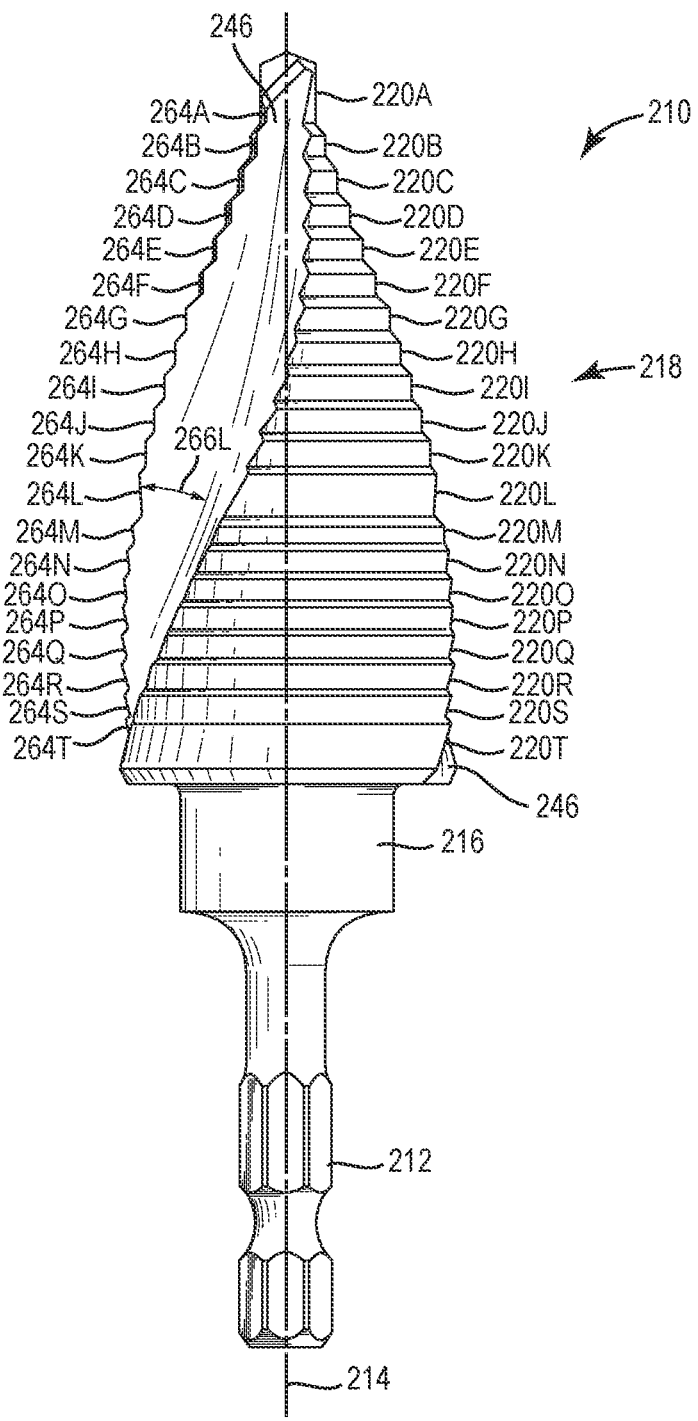
FIG. 10 is a side view of a step drill bit according to another embodiment of the invention.
Figure 11:
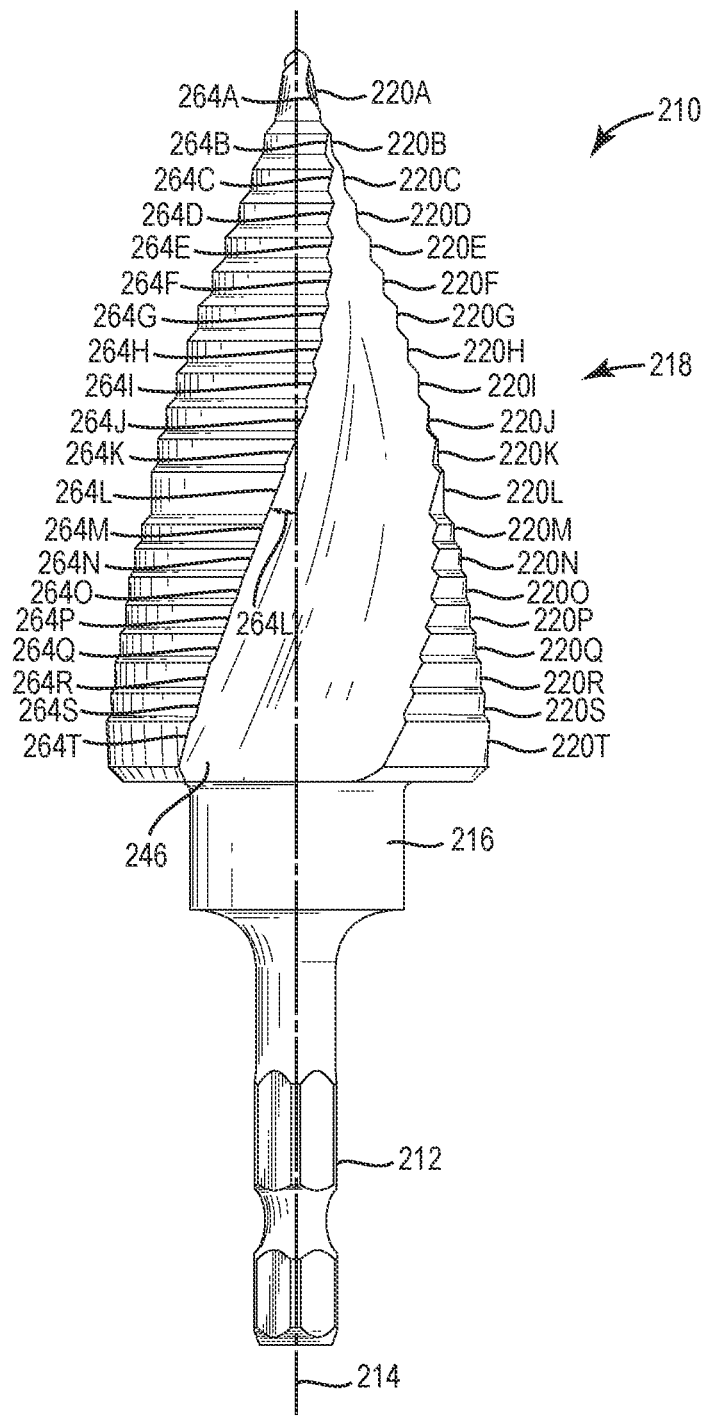
FIG. 11 is another side view of the step drill bit of FIG. 10 rotated 90 degrees.

FIGS. 10-11 illustrate a step drill bit 210 according to another embodiment of the invention. The step drill bit 210 includes features similar to the step drill bit 10 of FIGS. 1-7, and like features have been given like reference numbers plus 100. The step drill bit 210 may include any combination of features, dimensions, or range of dimensions from the preceding or subsequent embodiments, but only features of the step drill bit 210 not yet discussed with respect to the previous embodiment are detailed below.

The step drill bit 210 includes two flutes 246 and twenty axially stacked, progressively sized steps 220A-220T. A first step 220A has a diameter of approximately 0.188 inches, and a terminal step 220T has a diameter of approximately 1.13 inches. Each of the steps 220A-220T includes a leading cutting edge 264A-264T. Each cutting edge 264A-264T forms a rake angle (e.g., rake angle 266L labeled in FIG. 10) between the outer periphery of a respective step 220A-220T and the surface of a flute 246 and a helix angle (e.g., helix angle 268L labeled in FIG. 11) that is measured between the cutting edge 264A-264T and a bit axis 214.

The rake angle at the first step 220A is approximately 20 degrees, and the rake angle at the terminal step 20L is approximately 12 degrees. The intermediate steps 220B-220S have incrementally decreasing rake angles that are within a range from 12 degrees and 20 degrees. In some embodiments, the decrease to the rake angles may be linear or non-linear. In other embodiments, the rake angles may be smaller than 12 degrees or bigger than 20 degrees.

The helix angle at the first step 220A is approximately 10 degrees, and the helix angle at the terminal step 220T is approximately 18 degrees. The intermediate steps 220B-220S have incrementally increasing helix angles that are within a range from 10 degrees to 18 degrees. In some embodiments, the increase to the helix angles may be linear or non-linear. In other embodiments, the helix angles may be smaller than 10 degrees or larger than 18 degrees. In the illustrated embodiment, a ratio between the helix angle and the rake angle for the first step 220A is approximately 0.5, and the ratio between the helix angle and the rake angle for the terminal step 220T is approximately 1.5.

As mentioned above, the step drill bit 10, 110, 210 may include any number of steps 20, 120, 220 with any range of diameters that incrementally increase from the first step 20 to the terminal step 20. As shown in Table 1 below, for a particular minimum diameter to maximum diameter and number of steps of a step drill bit 10, 110, 210 the ratio between the first step 20 and the terminal step 20 may vary depending on the type of step drill bit 10, 110, 210.

| Min. Diameter (in) | Max. Diameter (in) | Number of Steps | Helix Angle/ Rake Angle | |
|---|---|---|---|---|
| | | | First Step | Terminal Step |
| 0.125 | 0.505 | 13 | 2.4 | 0.9 |
| 0.188 | 0.505 | 6 | 2.0 | 1.2 |
| 0.188 | 0.755 | 10 | 1.4 | 1.2 |
| 0.188 | 0.88 | 12 | 1.4 | 1.6 |
| 0.188 | 1.005 | 14 | 1.2 | 1.7 |
| 0.188 | 1.13 | 20 | 0.5 | 1.5 |

-continued

| Min. Diameter (in) | Max. Diameter (in) | Number of Steps | Helix Angle/Rake Angle | |
|---|---|---|---|---|
| | | | First Step | Terminal Step |
| 0.162 | 0.47 | 9 | 1.2 | 0.9 |
| 0.162 | 0.47 | 5 | 1.2 | 0.9 |
| 0.162 | 0.79 | 9 | 0.7 | 1.3 |
| 0.162 | 1.186 | 19 | 0.7 | 1.0 |

Additionally, for a particular maximum diameter of a drill bit 10, 110, 210 the percent the rake angle and the helix angle change from the first step 20 and the terminal step 20 may vary depending on the type of step drill bit 10, 110, 120. Table 2 below shows the percent of change between the first step 20 and the terminal step 20. For example, the helix angle of the cutting edge at the terminal step of a drill bit 10, 110, 210 may increase by at least 70 percent relative to the helix angle of the cutting edge at the first step of the drill bit 10, 110, 210. The rake angle of the cutting edge at the terminal step of the drill bit 10, 110, 210 may increase by at least 40 percent relative to the rake angle of the cutting edge at the first step of the drill bit 10, 110, 210. Preferably, the helix angle increases from the first step to the terminal step within a range between 70 and 450 percent, and the rake angle increases from the first step to the terminal step within a range between 40 and 500 percent.

In some embodiments, the percent change may be positive indicating the rake angle or helix angle increased from the first step 20 to the terminal step 20. In other embodiments, the percent change may be negative indicating the rake angle or helix angle decreased from the first step 20 to the terminal step 20.

| Max. Diameter (in) | Helix Angle | | | Rake Angle | | |
|---|---|---|---|---|---|---|
| | First Step (deg) | Terminal Step (deg) | Percent change (%) | First Step (deg) | Terminal Step (deg) | Percent Change (%) |
| 0.5 | 12 | 22 | 83 | 5 | 25 | 400 |
| 0.5 | 10 | 24.75 | 148 | 5 | 20 | 300 |
| 0.75 | 7 | 37 | 429 | 5 | 30 | 500 |
| 0.88 | 7 | 29 | 314 | 5 | 18 | 260 |
| 1.00 | 12 | 26 | 117 | 10 | 15 | 50 |
| 1.13 | 10 | 18 | 80 | 20 | 12 | −40 |
| 0.47 | 12 | 22 | 83 | 10 | 25 | 150 |
| 0.47 | 12 | 22 | 83 | 10 | 25 | 150 |
| 0.79 | 7 | 32 | 357 | 10 | 25 | 150 |
| 1.18 | 10 | 18 | 80 | 15 | 18 | 20 |

In some embodiments, the step drill bit 10, 110, 210 may include laser etchings on an outside surface of the steps 20 indicating to a user the diameter of a hole the particular step 20 would drill in a workpiece. In further embodiments, the step drill bit 10, 110, 210 may be coated in a protective coating with properties that increase wear resistance. For example, the step drill bit 10, 110, 210 may be coated in a titanium aluminum nitride coating (i.e., TiAlN) that is 2-5 microns thick. Alternatively, the step drill bit 10, 110, 210 may be coated in a titanium nitride coating (i.e., TiN) that is 2-5 microns thick. Further, the step drill bit 10, 110, 210 may be coated in an aluminum titanium nitride (i.e., AlTiN). In addition, step drill bits 10, 110, 210 with TiAlN, TiN, or AlTiN coatings may be heat treated and tempered. In other embodiments, the step drill bit may only be heat treated and tempered.

Optimizing the ratio between a helix angle and a rake angle on the cutting edges of steps on a step drill bit advantageously increases the speed and life of the step drill bit. A helix angle that is too high at a distal end of the step drill bit will provide poor hole quality. A helix angle that is too low at a distal end will cause the step drill bit to be slower during operation. A helix angle that is too high at the proximate end of a step drill bit will jam during operation. A helix angle that is too low at the proximate end of a step drill bit will be slower during operation and lessen the life of the step drill bit. A rake angle that is too high at the front and back of the step drill bit will cause the cutting edge to chip. A rake angle that is too low at the front and back of the step drill bit will be slow and produce poor hole quality. Thus, providing a step drill bit with a ratio between the helix angle and the rake angle between 0.5 and 2.4, ensures that the step drill bit cuts workpieces in a fast and clean manner while prolonging the life. Additionally, adding a wear resistance coating to the step drill bit will prolong the life of the step drill bit further.

Various features and advantages of the invention are set forth in the following claims.

What is claimed is:

1. A step drill bit comprising:
a shank extending along a bit axis;
a body having a proximal end adjacent the shank and a distal end opposite the proximal end, the body defining a plurality of axially stacked, progressively sized steps including a first step at the distal end, a terminal step at the proximal end, and a plurality of intermediate steps having incrementally increasing diameters disposed between the first and terminal steps;
a flute in the body extending from the distal end to the proximal end; and
a plurality of cutting edges formed in the body, each cutting edge disposed along one of the plurality of steps, each cutting edge defining a helix angle and a radial rake angle;
wherein the helix angle of the cutting edge at the terminal step is greater than the helix angle of the cutting edge at the first step; and
wherein the radial rake angle of the cutting edge at the terminal step is greater than the radial rake angle of the cutting edge at the first step.

2. The step drill bit of claim 1, wherein the plurality of intermediate steps includes at least four steps.

3. The step drill bit of claim 1, wherein a diameter of the terminal step defines a max diameter of the drill bit.

4. The step drill bit of claim 3, further comprising a transition portion between the body and the shank, the transition portion having a diameter that is smaller than the diameter of the terminal step.

5. The step drill bit of claim 1, wherein the flute is a first flute, and the drill bit further comprises a second flute on a diametrically opposite side of the bit axis from the first flute.

6. The step drill bit of claim 5, wherein the body includes a core depth defined between the first and second flutes and extending through the bit axis, the core depth increasing from the first step to the terminal step.

7. The step drill bit of claim 1, wherein adjacent steps of the plurality of steps are connected by a step chamfer.

8. The step drill bit of claim 7, wherein each step chamfer defines a ramp angle between a surface of the step chamfer and a plane extending perpendicular to the bit axis, each ramp angle is between approximately 40 degrees and approximately 50 degrees.

9. The step drill bit of claim 1, wherein the body includes a bit tip adjacent the first step.

10. The step drill bit of claim 9, wherein the bit tip includes a primary tip angle measured through the bit axis between approximately 130 degrees and approximately 140 degrees.

11. The step drill bit of claim 1, wherein each helix angle is between approximately 5 degrees and approximately 30 degrees.

12. The step drill bit of claim 11, wherein each radial rake angle is between approximately 5 degrees and approximately 35 degrees.

13. A step drill bit comprising:
a shank extending along a bit axis;
a body having a proximal end adjacent the shank and a distal end opposite the proximal end, the body defining a plurality of axially stacked, progressively sized steps including a first step at the distal end, a terminal step at the proximal end, and a plurality of intermediate steps having incrementally increasing diameters disposed between the first and terminal steps;
a flute in the body extending from the distal end to the proximal end; and
a plurality of cutting edges formed in the body, each cutting edge disposed along one of the plurality of steps, each cutting edge defining a helix angle and a radial rake angle;
wherein the radial rake angle of the cutting edge at the terminal step is greater than the radial rake angle of the cutting edge at the first step, and
wherein the radial rake angles of the cutting edges incrementally increase from a first step of the plurality of intermediate steps to a second step of the plurality of intermediate steps, and from the second step of the plurality of intermediate steps to a third step of the plurality of intermediate steps.

14. The step drill bit of claim 13, wherein each radial rake angle is between approximately 5 degrees and approximately 35 degrees.

15. The step drill bit of claim 13, wherein the wherein the plurality of intermediate steps includes at least four steps.

16. The step drill bit of claim 13, wherein the radial rake angle of the cutting edge at the terminal step increases by at least 40 percent relative to the radial rake angle of the cutting edge at the first step.

17. A step drill bit comprising:
a shank extending along a bit axis;
a body having a proximal end adjacent the shank and a distal end opposite the proximal end, the body defining a plurality of axially stacked, progressively sized steps including a first step at the distal end, a terminal step at the proximal end, and a plurality of intermediate steps having incrementally increasing diameters disposed between the first and terminal steps;
a flute in the body extending from the distal end to the proximal end; and
a plurality of cutting edges formed in the body, each cutting edge disposed along one of the plurality of steps, each cutting edge defining a helix angle and a radial rake angle;
wherein the helix angle of the cutting edge at the terminal step is greater than the helix angle of the cutting edge at the first step;
wherein the helix angles of the cutting edges incrementally increase from a first step of the plurality of intermediate steps to a second step of the plurality of intermediate steps, and from the second step of the plurality of intermediate steps to a third step of the plurality of intermediate steps.

18. The step drill bit of claim 17, wherein each helix angle is between approximately 5 degrees and approximately 30 degrees.

19. The step drill bit of claim 17, wherein the plurality of intermediate steps includes at least four steps.

20. The step drill bit of claim 17, wherein the helix angle of the cutting edge at the terminal step increases by at least 70 percent relative to the helix angle of the cutting edge at the first step.

* * * * *